United States Patent [19]
Sakamoto et al.

[11] 4,000,927
[45] Jan. 4, 1977

[54] CAPSULE HYDRAULIC-TRANSPORTATION SYSTEM

[75] Inventors: Masakatsu Sakamoto, Matsudo; Syosaku Watanabe; Takafumi Karino, both of Ibaraki; Isao Honma, Abiko, all of Japan

[73] Assignee: Hitachi, Ltd., Japan

[22] Filed: June 26, 1975

[21] Appl. No.: 590,468

[52] U.S. Cl. .................................. 302/2 R; 243/1; 302/14
[51] Int. Cl.[2] ....................................... B65G 51/00
[58] Field of Search .................... 302/1.2 R, 14–16; 243/1, 3, 5, 29, 30

[56] References Cited
UNITED STATES PATENTS

| 393,585 | 11/1888 | Robinson | 243/1 |
| 393,586 | 11/1888 | Robinson | 243/1 |

Primary Examiner—Evon C. Blunk
Assistant Examiner—Jeffrey V. Nase
Attorney, Agent, or Firm—Craig & Antonelli

[57] ABSTRACT

A capsule hydraulic-transportation system for use in continuously transporting capsules through a pipe line, in which system a discharge duct is connected in parallel at a forwarding station to a plurality of feeding ducts for feeding capsules, and the plurality of feeding ducts are by turns in timed sequence operated to continuously charge capsules into and transport same through the discharge duct to the pipe line.

10 Claims, 29 Drawing Figures

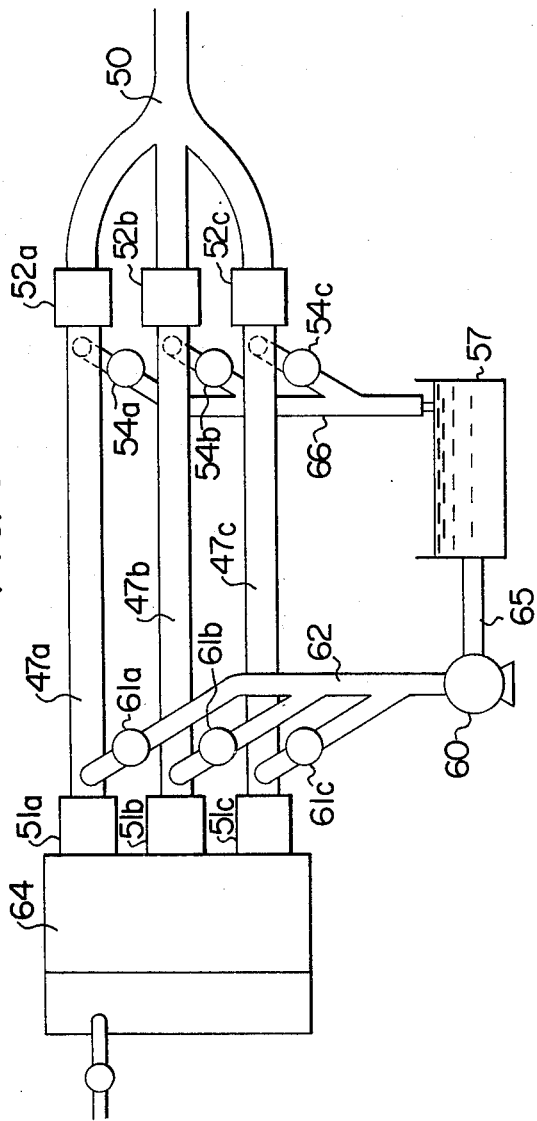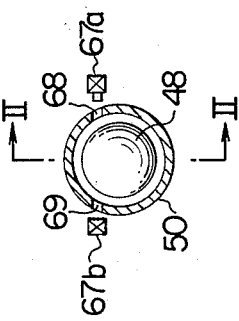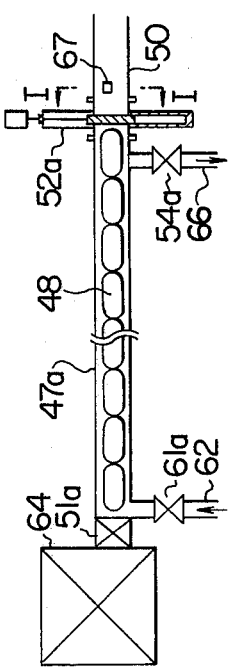

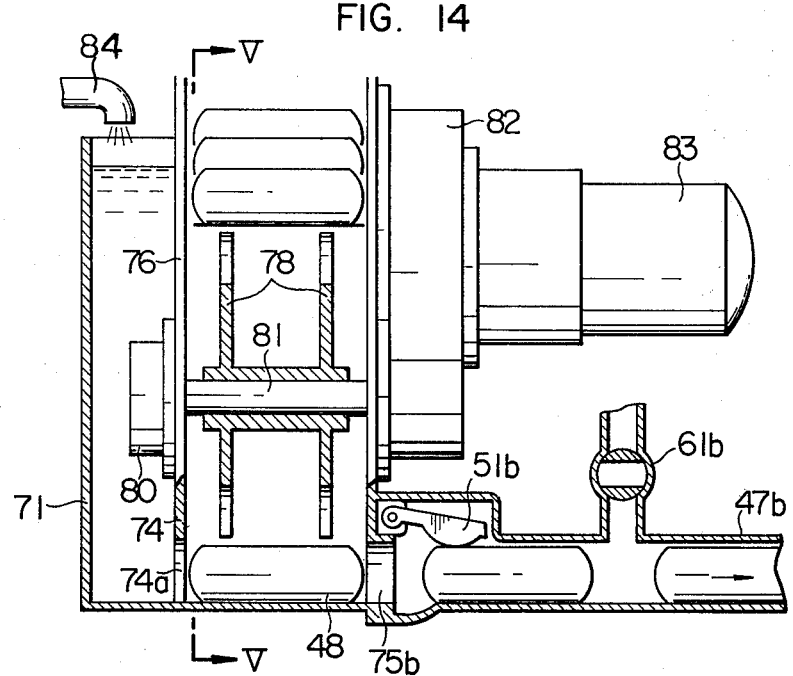
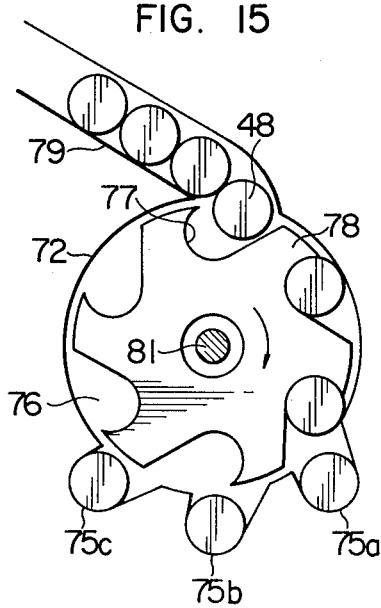
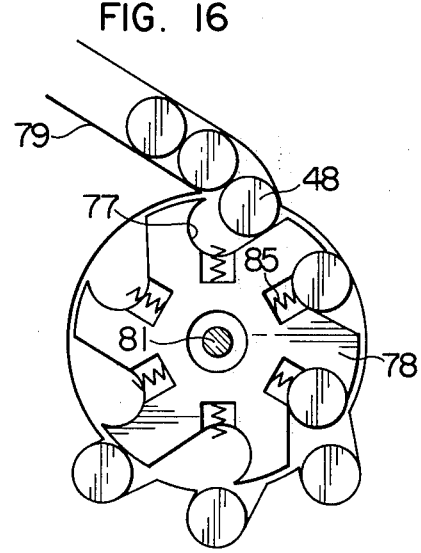

FIG. 22
FIG. 23
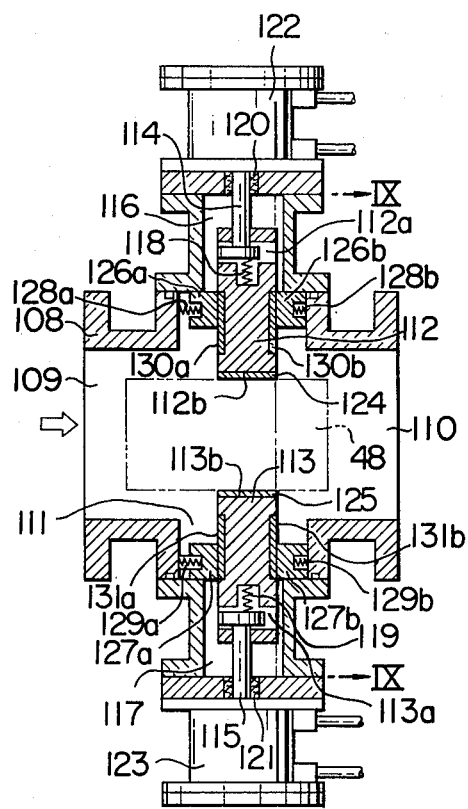
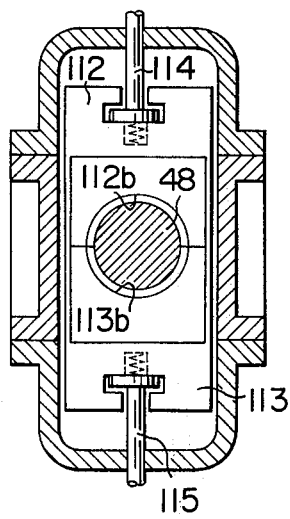

CAPSULE HYDRAULIC-TRANSPORTATION SYSTEM

This invention relates to a capsule hydraulic-transportation system for use in transporting materials such as chemical products, urban waste materials and the like by charging same into capsules and transporting those capsules through a pipe line.

A pipe line transportation system has many advantages such as enabling to save man power and efficient installation of transportation routes to a minimum extent, plus the elimination of public nuisance attended by the transportation. In additon, even a small diameter of pipe line allows the transportation of a great amount of materials according to the continuous running of the system, so that such a system may be used for fluid transportation of city gas, natural gas, crude oil and the like in the thermal power industry. In addition, such a system finds wide use in civil and mining industries by transporting solid materials such as ore, which has been milled into granular or fine powdered form and then mixed with water to obtain slurry.

However, solid materials containing granular matter and the like suffer from an excessive pressure loss, when same is transported intact, thus necessitating the use of a large scale installation for a long-distance transportation, with the resulting increase in power required and hence an increase in the transport expense.

In addition, once solid materials are partially sedimented or settled in a pipe line, they become solidified to thereby clog part of the pipe line, so that an excessively great man power is required for recovering or repairing the pipe line.

For this reason, as an attempt to eliminate the aforesaid shortcomings, there has been proposed a capsule hydraulic transportation system for transporting solid materials through a pipe line with the solid materials charged in capsules. With such a system, however, capsules are fed into a pipe line through feeding pipes charged with a transporting liquid such as clear water. If the specific gravity of the entire capsule is greater than that of water, there results satisfactory sinking or feeding of the capsules into the feeding pipes. However, if the specific gravity of the entire capsule is smaller than that of clear water, then the capsule tends to float on to the surface of water in the pipes or dwells midway therein, resulting in difficulty in feeding same therein.

As a result, upon charging of materials into capsules, it is imperative that the specific gravity of the entire capsule be close to that of clear water or slightly greater than the latter.

Yet furthermore, the prior art capsule transportation system suffers from drawbacks in that, in case a capsule is jammed in a valve, then the capsule is ruptured and as a result the materials charged therein are scattered throughout a pipe line, thereby clogging the pipe line. This not only leads to damage in the valve itself but also an excessively great amount of man power for repairing such a damage.

It follows from this that, for positively and safely transporting capsules, the spacing between capsules should be increased to some extent or the transportation speed of capsules should be controlled so as not to be increased to an extent that is not required, thereby providing suitable spacings among capsules being transported. This attempt however lowers the transportation efficiency of capsules.

For avoiding the aforesaid shortcomings, it is mandatory that the presence of capsules be checked before closing the valve. The provision of detecting means upstream of the valve is one of solutions to this problem. However, since there results a variation in the speed of capsules due to their specific gravity, shapes and the like, the mere confirmation of the presence of a capsule does not always insure the absence of a capsule in the feeding pipes which leads to the transportation pipe line.

It is the first object of the present invention to provide a capsule hydraulic-transportation system which includes a loop pipe line connecting the forwarding stations of capsules to capsule receiving stations to thereby transport same through the aforesaid circular transportation pipe line.

It is the second object of the present invention to provide a capsule hydraulic-transportation system which enables the continuous ready and positive transportation of capsules into the transportation pipe line, irrespective of the specific gravity of a capsule.

It is the third object of the present invention to provide a capsule hydraulic-transportation system which provides a continuous capsule-feeding or charging means including a plurality of pipes, into which capsules are to be fed.

It is the fourth object of the present invention to provide a capsule hydraulic-transportation system which provides a capsule charging and receiving means, that enables the charging of transportation capsules into a loop pipe line and the discharging of empty capsules from the aforesaid pipe line.

It is the fifth object of the present invention to provide a capsule hydraulic-transportation system which provides hydraulic-transportation capsules which permit readily charging and discharging of materials to be transported, into or from the capsules.

It is the sixth object of the present invention to provide a capsule hydraulic-transportation system which provides a valve means achieving a valving function, in response to the receipt of a capsule by the aforesaid valve means.

It is the seventh object of the present invention to provide a capsule hydraulic-transportation system which provides a check valve means insuring safe and positive transportation control of capsules.

These and other features of the present invention may readily be attained in a capsule hydraulic-transportation system which comprises: a loop pipe line connecting a plurality of capsule forwarding stations to one or a plurality of capsule receiving stations; hopper means for charging into said system the materials to be transported; capsule charging means for charging materials to be transported, into a capsule; capsule feeding means for feeding capsules to the succeeding step; capsule charging and receiving means for charging or receiving capsules into or from said pipe line, said hopper means, capsule charging means, capsule feeding means, and capsule charging and receiving means being located at said forwarding stations; separating means for separating capsules from transporting liquid, said capsules being carried by said transporting liquid; material taking out means for taking out materials from said capsules; and returning means for returning empty capsules back to said pipe line, said separating means, said material taking out means and said returning means being located at said capsule receiving station or stations.

Figure 8:
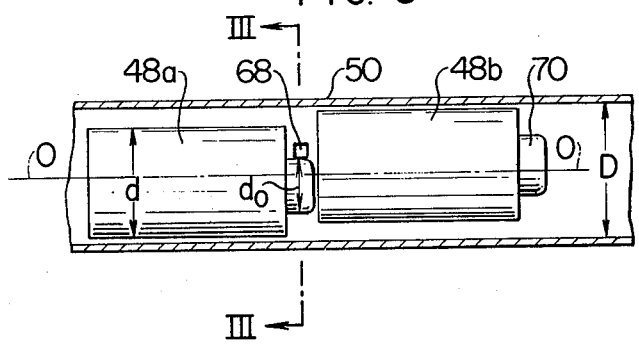
Figure 9:
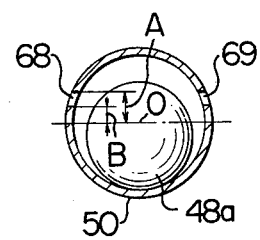
Figure 10:
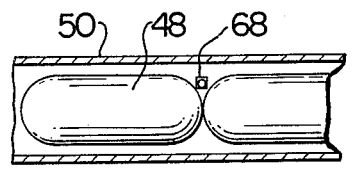
Figure 11:
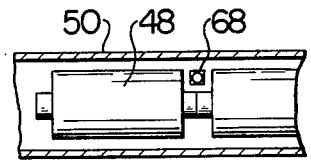
Figure 12:
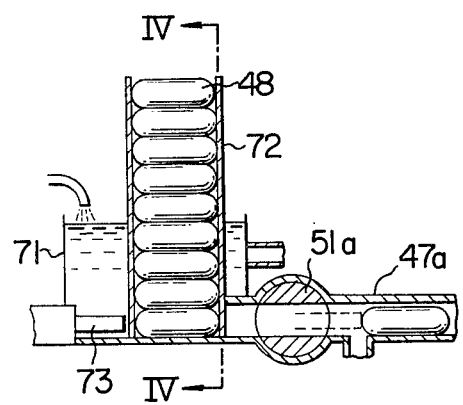
Figure 13:
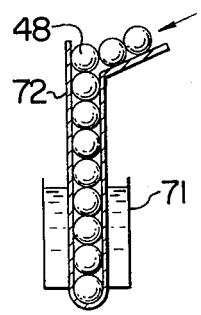
Figure 17:
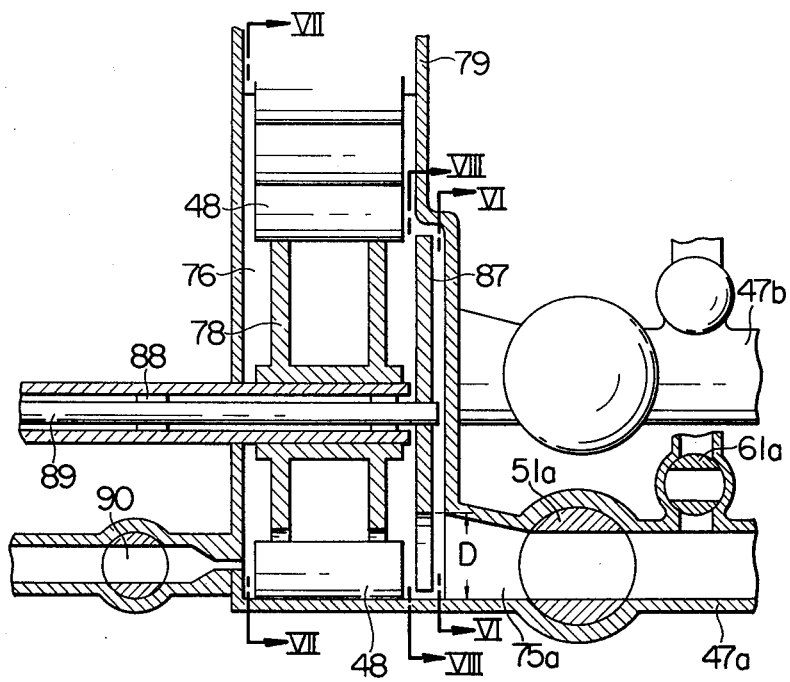
Figure 18:
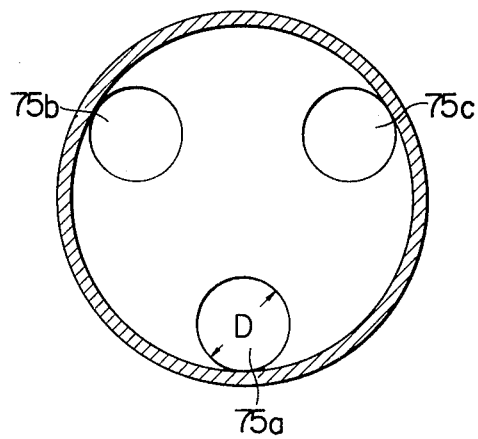
Figure 19:
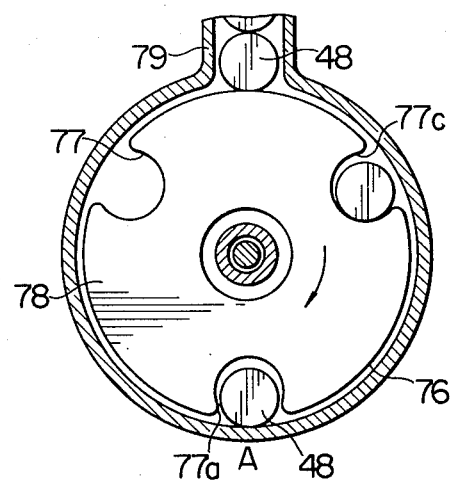
Figure 20:
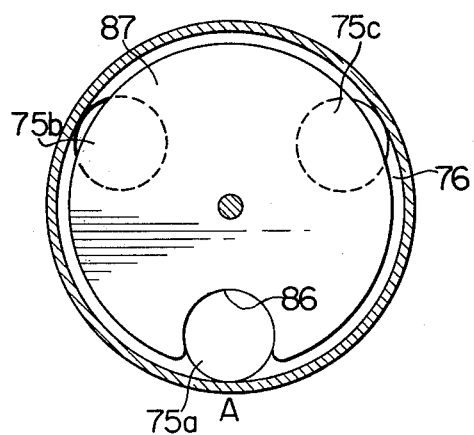
Figure 21:
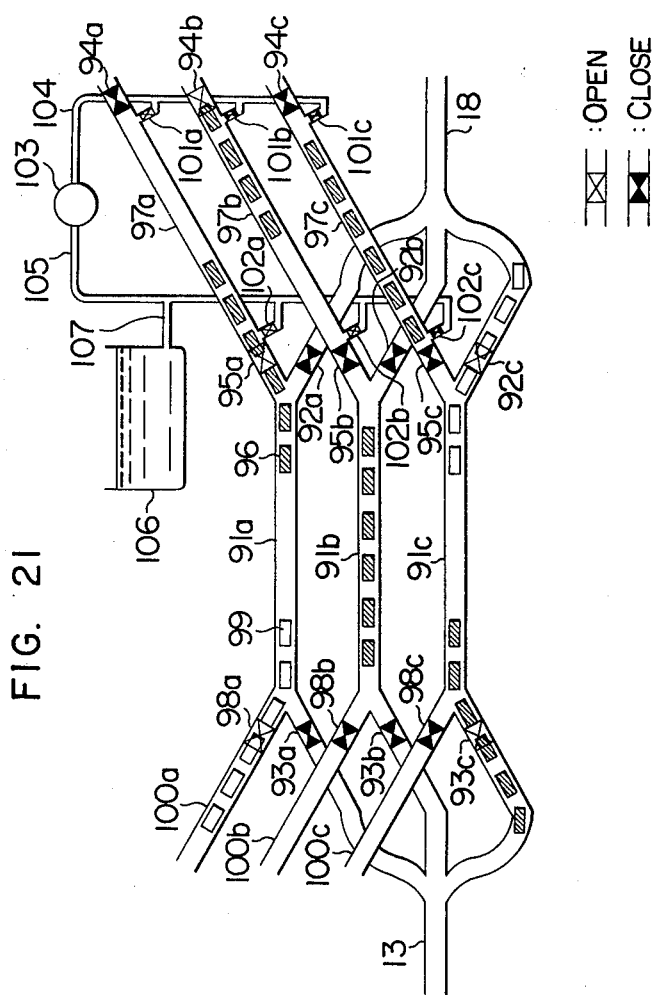
Figure 24:
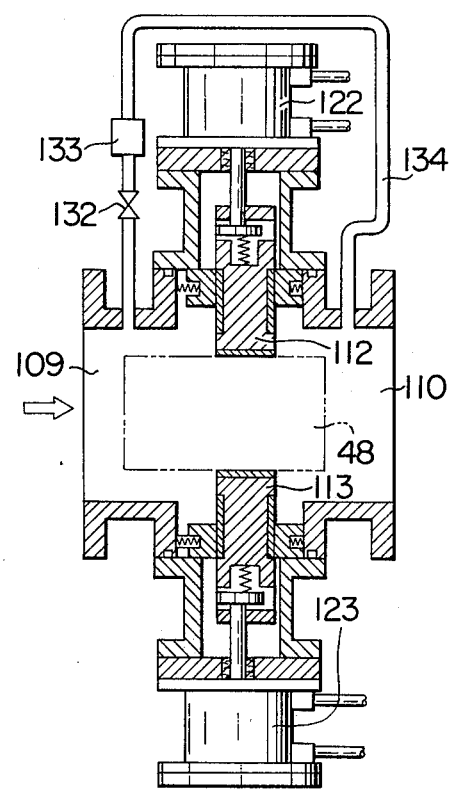
Figure 25:
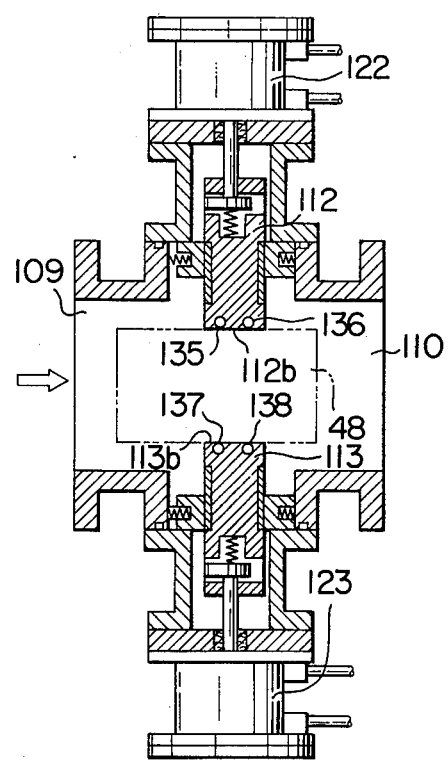
Figure 26:
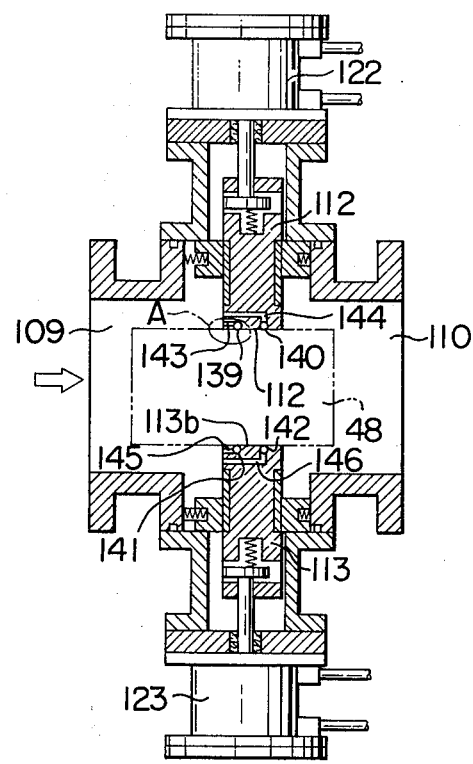
Figure 27:
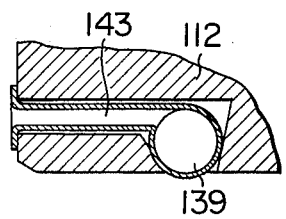
Figure 28:
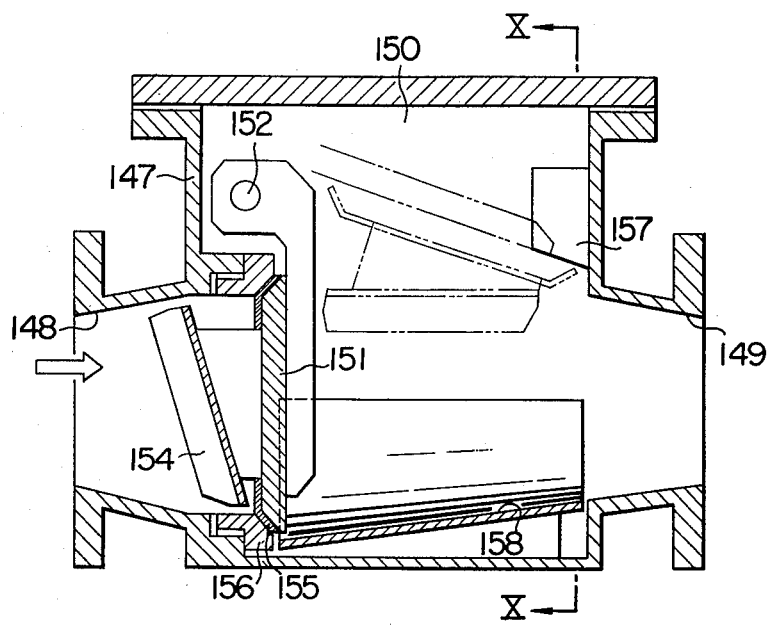
Figure 29:
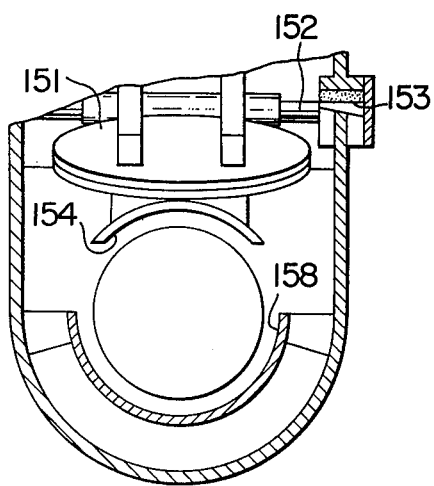

FIGS. 5 through 11 are views of other embodiments of the invention, of the capsule feeding means for use in the hydraulic-transportation system according to the present invention, in which FIG. 5 shows an outline thereof, FIG. 6 is a view illustrating the operating condition thereof, FIG. 7 is a cross-sectional view taken along the line I—I of FIG. 6, FIG. 8 through FIG. 11 are views illustrating the cross section taken along the line II—II of FIG. 7, in which FIG. 8 is a view showing the case of capsules having different specific gravities, FIG. 9 is a cross-sectional view taken along the line III—III of FIG. 8, and FIGS. 10 and 11 are views showing the cases of capsules having different end shapes;

FIG. 12 is a cross-sectional view of one embodiment of a charging means;

FIG. 13 is a cross-sectional view taken along the line IV—IV of FIG. 12;

FIG. 14 is a view showing another embodiment of the charging means;

FIG. 15 is a view illustrating one example of the cross sectional view taken along the line V—V of FIG. 14;

FIG. 16 is a view illustrating another example of the cross-sectional view of FIG. 15;

FIGS. 17 through 20 are views showing still further embodiments of the charging means, in which FIG. 17 is an outline of a cross-sectional view of the charging means, FIG. 18 is a cross-sectional view taken along the line VI—VI of FIG. 17, FIG. 19 is a cross-sectional view taken along the line VII—VII of FIG. 17, and FIG. 20 is a cross-sectional view taken along the line VIII—VIII of FIG. 17;

FIG. 21 is an outline of one embodiment of the capsule charging and receiving means for use in the capsule hydraulic-transportation system according to the present invention;

FIG. 22 and FIG. 23 are views showing one embodiment of a valve means for use in the capsule hydraulic-transportation system according to the invention, in which FIG. 22 is a cross-sectional view of the valve means, as viewed from front, and FIG. 23 is a cross-sectional view taken along the line IX—IX of FIG. 22;

FIGS. 24 through 27 are views illustrating further embodiments of the valve means for use in the capsule hydraulic-transportation system according to the present invention, in which FIG. 24 is a cross-sectional view of the valve means having entrance side of a valve plate communicated with the exit side thereof by means of a bypass pipe, as viewed from front, FIG. 25 is a cross-sectional view of the valve means including a valve plate, on which a sealing ring is mounted, as viewed from front, FIG. 26 is a cross-sectional view of the valve means having valve plate, in which a water-tight pipe is embedded, as viewed from front, and FIG. 27 is an enlarged cross-sectional view of the portion 'A' of FIG. 26;

FIG. 28 is a cross-sectional view showing one embodiment of a check valve means for use in the capsule hydraulic-transportation system according to the present invention; and FIG. 29 is a cross-sectional view of the valve plate maintained in its fully opened position, taken along the line X—X of FIG. 28.

Figure 1:
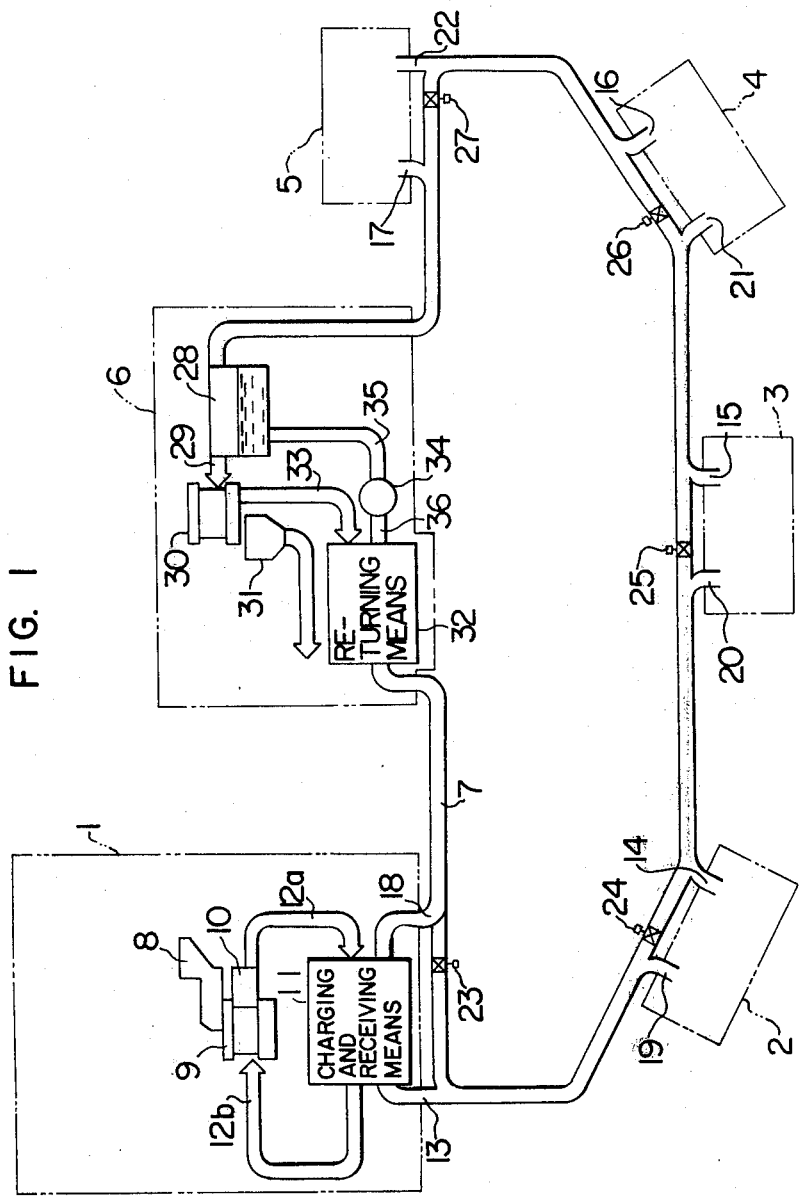
FIG. 1 is a schematic view showing the outline of the capsule hydraulic-transportation system according to the present invention.

Referring now to FIG. 1, there is shown a capsule hydraulic-transportation system according to the present invention.

Forwarding stations 1 to 5 are connected to a receiving station 6 by way of a single pipe line 7 in such a manner to form a loop.

Provided in the capsule forwarding stations 1 to 5 is a charging means 8 which charges materials being transported, such as various kinds of raw materials, chemical products and urban waste materials, into the transportation system. Located below the charging means 8 are a capsule packaging means 9 for charging materials, to be transported, into capsules, and a capsule feeding means 10 for feeding those capsules to the next means. Located below the capsule packaging means 9 is a capsule charging and receiving means 11 which is adapted to charge the capsules into the pipe line 7 and receive the empty capsules, which have been returned from the capsule receiving station 6, from the pipe line 7, said charging and receiving means 11 being connected to the capsule feeding means 10 and capsule packaging means 9 by way of ducts 12a, 12b. In addition, the respective charging and receiving means 11 are bypassed to the pipe line 7 by way of ducts 13 to 17, and 18 to 22. Provided in the pipe line 7, to which are connected the respective charging and receiving means 11, are on-off valves 23 to 27.

On the other hand, provided in the capsule receiving station 6 is a separating means 28 which is adapted to separate capsules from the transporting liquid, which capsules have been carried by the transporting liquid from the forwarding stations 1 to 5. The separating means 28 is connected by way of duct 29 to a material taking-out means 30 which is adapted to take out the materials transported from capsules. Provided on one side of the taking-out means 30 is a hopper 31 which receives the materials which have been transported and then taken out, while a returning means 32 adapted to return empty capsules to the pipe line 7 is connected to the other side of the means 30 by way of duct 33. Connected to the separating means 28 and the returning means 32 by way of ducts 35 and 36 is a pump 34 adapted to drive the capsules in the pipe line 7.

Figure 2:
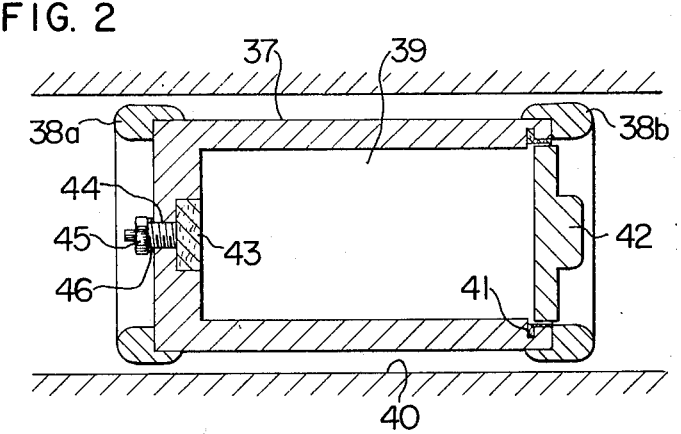
FIG. 2 is a longitudinal cross-sectional view of one embodiment of the invention, which shows a hydraulic-transportation capsule for use in the hydraulic-transportation system according to the present invention.

FIG. 2 shows one embodiment of capsules for use in the capsule hydraulic-transportation system according to the present invention. Defined in a capsule body 37 and interposed between head portions 38a and 38b of an annular or cylindrical shape is a capsule housing chamber 39, which head portions 38a, 38b are mounted on the opposite ends of the body 37.

The head portions 38a, 38b have their outer circumferential surfaces slidably in contact with the inner circumferential surface of the duct 40, so that the outer surfaces are subject to the pressure from the transporting liquid, and damage of the end portions of the body is prevented thereby.

A cover 42 is threadedly fitted into one end of the capsule housing chamber 39 with a packing 41 therebetween for maintaining air tightness for the interior of the capsule, while a communicating hole 44 is formed on the other or opposite end of the chamber 39 for aiding in charging and taking out materials into or from the capsule and is open to communicate the interior of the body to the exterior thereof through the medium of a filter 43. A plug 45 is fitted into the communicating hole 44 together with a piece of packing 46 for maintaining air-tightness for the capsule during transportation.

By these arrangements, when charging materials into the capsule housing chamber 39, the materials are positively charged into the capsule housing chamber 39 through its opening, into which the cover 42 is fitted, by connecting the communicating hole 44 to a suction side of such a device as a compressor and the like.

On the other hand, when taking out the materials from the capsule, the communicating home 44 may be connected to a discharging side of such a device as a compressor.

Figure 3:
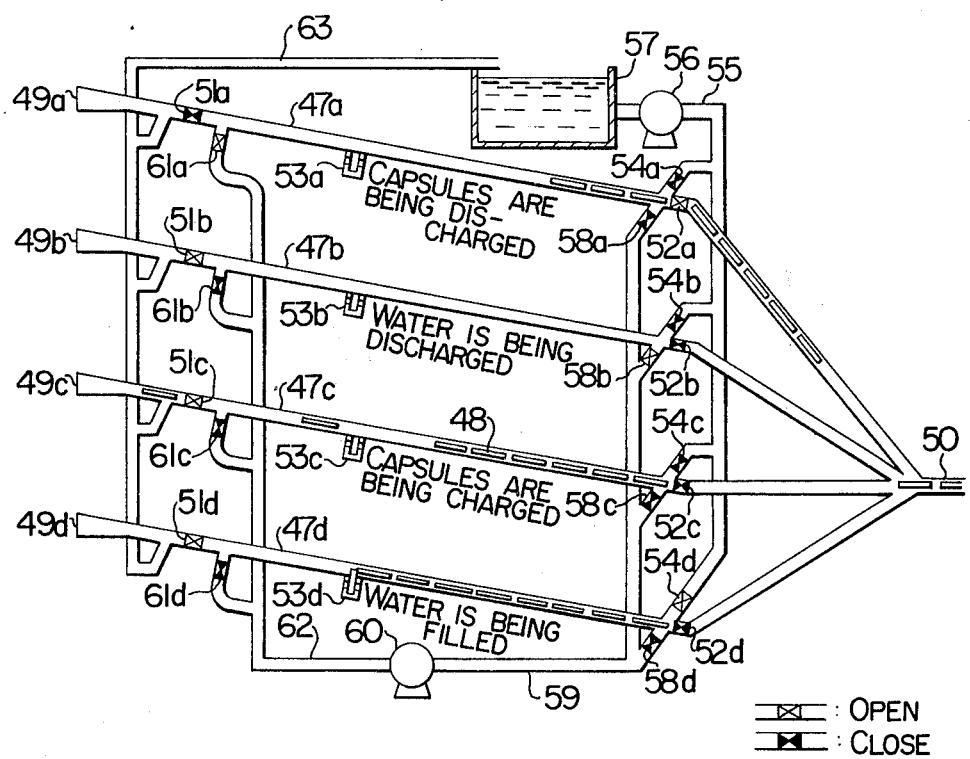
FIG. 3 is an outline of a cross-sectional view showing one embodiment of capsule feeding means for use in the hydraulic-transportation system according to the present invention.
Figure 4:
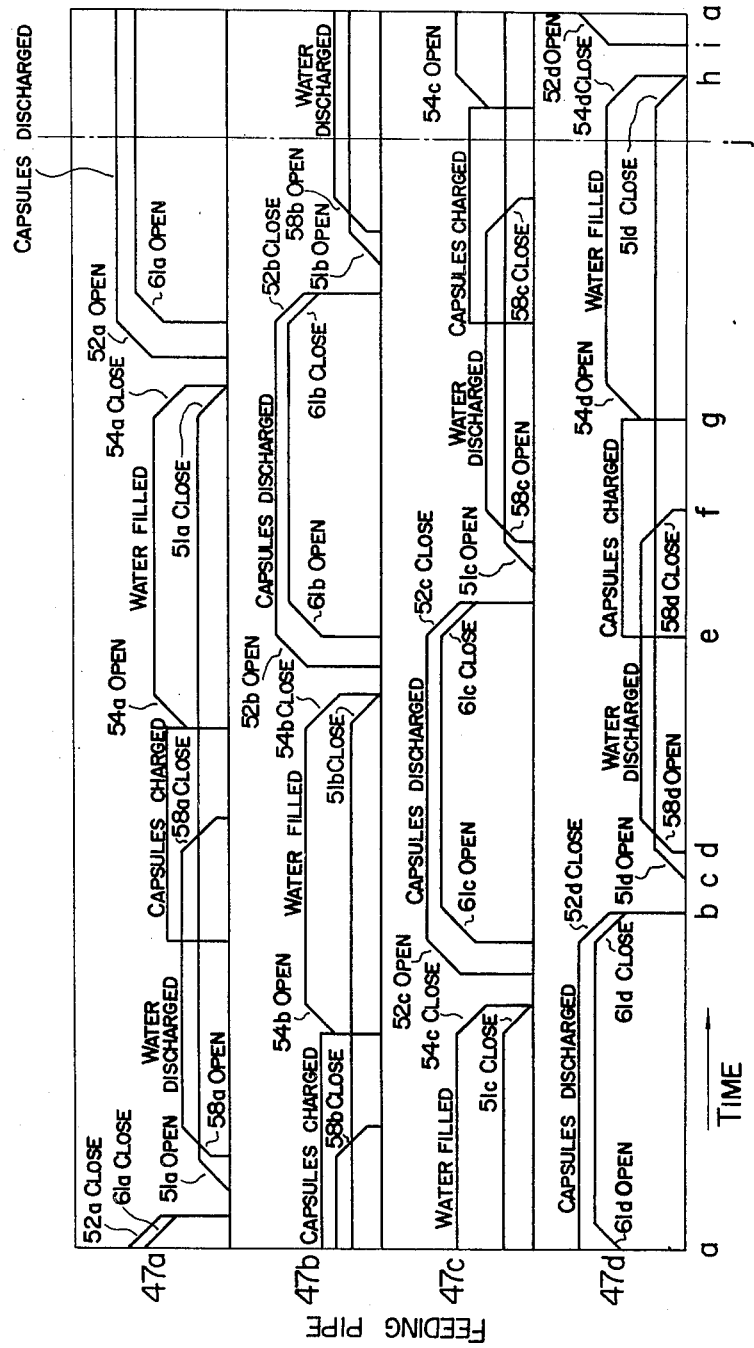
FIG. 4 is an explanatory view of a time cycle of the system according to the present invention.

FIGS. 3 and 4 show one embodiment of a capsule feeding means for use in the capsule hydraulic-transportation system according to the present invention.

Referring now to FIG. 3, charging ports 49a to 49d for capsules 48 are provided at the one ends of the feeding ducts 47a to 47d which run slantwise in parallel relation to each other. On the other hand, a duct 50 leading to charging and receiving means (not shown) is connected to the other ends of the feeding ducts 47a to 47d. Provided in the feeding ducts 47a /to 47d on the side of the charging ports 49a to 49d are charging valves 51a to 51d. Provided in the feeding ducts on the side of duct 50 are transportation valves 52a to 52d.

At appropriate positions in the feeding ducts between the charging valves 51a to 51d and the transportation valves 52a to 52d are provided stoppers 53a to 53d which prevent floating of capsules. A tank 57 is connected to the feeding ducts 47a to 47d by way of a liquid filling pump 56, a pipe 55 and liquid filling valves 54a to 54d, and a high pressure pump 60 is connected on the suction side thereof to the feeding ducts 47a to 47d by way of liquid discharging valves 58a to 58d and a pipe 59.

The discharge side of a high pressure pump 60 is connected at appropriate positions between charging valves 51a to 51d and stoppers 53a to 53d to the feeding ducts 47a to 47d by way of pressure feeding valves 61a to 61d and a pipe 62.

The tank 57 is connected by way of a pipe 63 at appropriate positions between the charging ports 49a to 49d and the charging valves 51a to 51d to the feeding ducts 47a to 47d.

In operation of the aforesaid arrangement as shown in FIG. 4, the charging of capsules 48 and liquid filling operation have been completed at the time a in the feeding duct 47a with the transportation valve 52d opened and the pressure feeding valve 61d starts to open.

When the pressure feeding valve 61d is opened, then the transporting liquid is introduced by means of the high pressure pump 60 into the feeding duct 47d, while capsules 48 charged are in turn fed into the duct 50 through transportation valve 52d.

At the time b when the transportation valve 52d and the pressure feeding valve 61d are closed, all of capsules 48 have been discharged from the feeding duct 47d.

At the time c, the charging valve 51d is opened to release the pressure in the feeding duct to atmosphere.

When the liquid discharging valve 58d is opened at the time d, the transporting liquid within the feeding duct 47d is introduced through the pipe 59 to the suction side of the high pressure pump 60 and then discharged.

From the time e when the discharging of the transporting liquid is in progress, the capsules 48 are successively dropped and charged through the charging port 49d and then charging valve 51d into the feeding duct 47d. At the time f when the capsules are being charged, the discharging of liquid has been completed and thus the liquid discharging valve 58d is closed. At the time g when the charging capsules 48 has been completed, the rearmost capsule 48 is retained by means of the stopper 53d which projects into the feeding duct 47d. As a result, even if the liquid filling valve 54d is opened and the transporting liquid is filled into the feeding duct 47d by means of the liquid filling pump 56, there is no possibility that capsules float.

At the time h when the feeding duct 47d has been filled up to the entrance of the pipe 63 with the transporting liquid by means of the liquid filling pump 56, connected, which pipe is connected at the position between the charging port 49d and the charging valve 51d to the feeding duct, the charging valve 51d and liquid filling valve 54d are closed.

At the time i, the transportation valve 52d is opened, and the cyclereturns to the condition at the time a, whereupon the pressure feeding valve 61d is opened and the capsules 48 are charged into the duct 50.

The aforesaid operation described in connection with the feeding duct 47d is repeated in timed sequence as shown in FIG. 4, which can be applied to the remainder of feeding ducts. Thus, the capsules 48 may be continuously fed into the duct 50.

FIG. 3 shows the condition of the operation at the time j in FIG. 4.

FIGS. 5 to 13 show further embodiments of the capsule feeding means according to the present invention.

Like parts are designated by the same reference numerals as those shown in FIG. 3.

Referring to FIG. 5, each of parallel feeding ducts 47a to 47c are connected at the one ends thereof to the capsule charging means 64 by way of charging valves 51a to 51c and at the other ends thereof to the duct 50 by way of transportation valves 52a to 52c.

A liquid tank 57 is communicated adjacent the charging valves 51a to 51c with the feeding ducts 47a to 47c through pressure feeding valves 61a to 61c, a pipe 62, a high pressure pump 60 and a pipe 65, and, in turn, is communicated adjacent the transportation valves 52a to 52c with the feeding ducts 47a to 47c through liquid discharging valves 54a to 54c and a pipe 66.

There is provided a capsule counter 67 of a photoelectric type, as shown in FIGS. 6 and 7 in the duct 50 which is adjacent transportation valves 52a to 52c.

The counter 67 consists of a light source 67a and a light detecting means 67b which respectively are disposed in aligned relation with a pair of transparent windows 68 and 69 mounted on the duct 50.

The positions of the transparent windows 68 and 69 on the duct 50 are shown in FIGS. 8 and 9. As shown, the respective capsules 48a, 48b are formed into a cylinder having a projecting portion 70 at least in the center of the end face thereof thereby providing spaces between the adjoining capsules.

Now assuming that one of the capsules 48a is greater in its specific gravity than the transporting liquid and the specific gravity of the other capsule 48b is smaller than the liquid, then the former flows contacting with the lower surface of the interior of the duct 50 and the latter flows contacting with the upper surface of the interior of the duct 50. Accordingly, it is established that the transparent windows 68, 69 be positioned between distances A and B as measured from the center axis 0—0 of the duct. This relationship is given by the following formulae:

$$A < d - D/2 \tag{1}$$

$$B > \tfrac{1}{2} (D - d + do) \tag{2}$$

wherein
D : inner diameter of transportation duct
d : outer diameter of capsule
do : outer diameter of a projecting portion of the end face of a capsule.

Thus, the distances A and B are selected so as to satisfy the aforesaid formulae (1) and (2), so that even if capsules advance in the duct at any level, the capsules can be counted by the counter with out fail.

Alternatively, the shape of the capsule 48 may be formed with partial spherical projections on the opposite end faces thereof, as shown in FIG. 10, or may be formed with projections as shown in FIG. 11 to thereby provide a space between adjacent capsules. In the former case, do in the formula (1) is zero.

FIGS. 12 and 13 show one embodiment of the charging means 64 as shown in FIG. 5. The charging means 64 consists of a water tub 71 connected to the feeding duct 47a, a capsule gude 72 adapted to vertically guide capsules 48 into the water tub, and a push out mechanism 73 for capsules 48 which mechanism serves to push out the lowermost one of the capsules 48 stacked one on top another in the capsule guide 72, by way of the charging valve 51 into the feeding duct 47a. The push out mechanism 73 is also constructed to be automatically stopped when a predetermined number of capsules have been pushed out.

In this manner, the capsules 48 are continuously pushed out into the feeding duct 47a by means of the push out mechanism 73.

FIGS. 14 to 16 show further embodiments of the charging means 64 as shown in FIG. 5. The charging means 64 consists of: a water tub 71 connected to feeding ducts 47a to 47c; capsule charging chambers 76 defined by a capsule guide 72 and a partition wall 74 formed with lower opening 74a communicating with the water tub 71, said chambers 76 having entrance portions 75a to 75c communicating with the respective feeding ducts 47a to 47c by way of charging valves 51a to 51c; a rotary disc 78 having a plurality of capsule retaining grooves 77 and rotatably mounted within the capsule charging chamber 76; and a hopper 79 for feeding capsules 48 into the capsule charging chamber 76.

The rotary disc 78 is mounted on a rotary shaft 81 which is journaled on a pair of bearings 80 and is driven by means of a motor 83 by the medium of a reduction gear 82.

The water tub 71 is filled with water supplied by way of water feeding pipe 84.

When capsules are charged in the feeding duct 47b, the pressure feeding valve 61b is closed and, at the same time, the liquid discharging valve 54b is opened The charging valve 51b then is opened and the transportation valve 52b is closed, so that water having water head in the water tub 71 flows through the charging valve 51b into the feeding duct 47b and then by way of liquid discharge valve 54b and a pipe 66 into the liquid tank 57.

In this case, the capsules 48 charged from the hopper 79 into the capsules retaining grooves 77 in the rotary disc 78 are moved due to the clockwise rotation of the rotary disc 78 and then automatically dropped into the entrance portion 75b of the capsule charging chamber 76, which entrance portion communicates with the feeding duct. The capsules 48 thus dropped are charged into the feeding duct 47b due to the water flow from the water tub 71.

When the capsules 48 are charged in the feeding duct 47b in this manner and then the feeding ducts 47b becomes full of capsules, the transportation valve 52b and the pressure feeding valve 61b are opened by means of an indicating means (not shown), which is separately provided, and, at the same time, the liquid discharge valve 54b is closed. As a result, the capsules 48 in the feeding duct 47b are conveyed to a desired position through the duct 50 by means of high pressure water fed by the high pressure pump 60.

On the other hand, since the charging valve 51b is closed, and, accordingly, water is stopped to flow out from the water tub 71 the capsule 48 dropped into the entrance portion 75b of the capsule charging chamber 76 remains there. When a capsule remains stationary in the entrance portion 75b in this manner, another capsule retained in the capsule retaining groove 77 in the rotary disc 78 then rolls over the capsule held in the entrance potion 75b into the subsequent entrance portion 75c. The aforesaid operation will be repeated in the same manner as described.

In this case, if the apparent specific gravity of a capsule is greater than that of water, the capsule will drop into the entrance portion of the capsule charging chamber by its gravity. However, if the specific gravity of a capsule is smaller than that of water, springs 85 for pushing capsules out may be preferably provided in the bottom portions of the capsule retaining grooves 77 in the rotary disc 78, as shown in FIG. 16.

Thus, by repeating the aforesaid operation for a plurality of feeding ducts 47a to 47c, capsules can be continuously transported to desired positions by way of the duct 50.

FIGS. 17 to 20 show further embodiments of the charging means 64 as shown in FIG. 5. The charging means 64 consists of: a capsule charging chamber 76 communicating with capsule charging ports 75a to 75c of the feeding ducts 47a to 47c; a hopper 79 mounted in the charging chamber 76; a rotary disc 78 having a plurality of capsule retaining grooves 77a to 77c and rotatably mounted within the capsule charging chamber 76; and a switching plate 87 having a single capsule discharging port 86.

The rotary disc 78 is continuously rotated through a hollow rotary shaft 88 by means of a drive means (not shown), and a switching plate 87 is intermittently driven through a rotary shaft 89, extending through the hollow rotary shaft 88 by means of a drive means (not shown) so as to coact with the charging valves 51a to 51c.

The capsule charging chamber 76 is provided outside of its lower portion with a suitable mechanism, for example, a water jet mechanism 90 which serves to push the capsules 48 into the capsule charging ports 75a to 75c of the feeding ducts. The diameters D of the enlarged portions of the charging ports 75a to 75c are designed to satisfy the following formula so that the capsules 48 maybe discharged from the rotary disc 78 by means of the water jet mechanism 90 and then smoothly charged into the capsule charging ports 75a to 75c of the feeding ducts by way of the capsule discharging port 86 of the switching plate 87:

$$D \geq V.t + dl \tag{3}$$

wherein $V = (\pi d_2 N/60)$, $t = l/v$

- $d1$; diameter of capsule 49
- $d2$; diameter of rotary disc 78
- $l$; length of capsule 48
- $t$; time required for the capsule 48 to be detached from rotary disc 78
- $v$; velocity of capsule 48 entering into charging ports 75a to 75c
- N; R.P.M. of rotary disc 78
- V; peripheral speed of rotary disc 78

In case capsules are charged into the feeding duct 47a, the pressure feeding valve 61a is closed and, at the same time, the liquid discharge valve 54a is opened with the result that the charging valve 51a is opened and the transportation valve 52a is closed, so that water within a water tub (not shown) is introduced due to its water head by way of charging valve 51a into the feeding duct 47a, and then by way of a liquid discharge valve 54a and pipe 66 into the liquid tank 57.

In this case, the capsules 48 held in the hopper 79 are continuously charged into the capsule retaining grooves 77a to 77c of the rotary disc 78, which continuously rotates within the capsule charging chamber 76, as shown in FIGS. 19 and 20, and then moved due to the clockwise rotation of the rotary disc 78 and reach the position A which faces the capsule charging port 75a of the feeding duct 47a.

Simultaneously therewith, the switching plate 87 is rotated in the clockwise direction in cooperation with the charging valve 51a, so that the capsule discharging port 86 reaches the position A which faces the aforesaid capsule charging port 75a.

When in this manner the capsule retaining groove 77a of the rotary disc 78, the capsule discharging port 86 of the switching plate 78 and the capsule charging port 75a of the feeding duct come together, then the capsules 48 are pushed out from the capsule retaining groove 77a by means of water jet from the water jet mechanism 90 to thereby be smoothly charged into the feeding duct 47a by way of the capsule charging port 75a.

At this time, the switching plate 87 remains stationary in the position A. When the feeding duct 47a becomes full of capsules 48, then the pressure feeding valve 61a is opened by means of an indicating means (not shown) which is separately provided, and, at the same time, the liquid discharging valve 54a is closed and the transportation valve 52a is opened, so that the capsules in the feeding duct 47a are conveyed to desired positions through the duct 50 by means of high pressure water which is supplied by the high pressure pump.

In this case, the charging valve 51a begins to be closed after the last capsule 48 to be fed into the feeding duct 47a has completely passed through the charging valve 51a. At the same time, the switching plate 87 is rotated in the clockwise direction, so that the capsule charging ports 75a to 75c of the respective feeding ducts are maintained closed.

On the other hand, the moment the charging valve 51a begins to be closed, the charging valve 51b of the subsequent feeding duct 47b begins to open. When the charging valve 51b has completely opened, the capsule discharging port 86 of the switching plate 87 is brought into register with the capsule charging port 75b of the feeding duct 47b, so that capsules may be charged into the feeding duct 47b and conveyed through the duct 50 in the same manner.

In the case of the feeding duct 47c, the operation similar to the above is carried out and then the aforesaid operation is repeatedly carried out for the respective feeding ducts in sequence, so that capsules can be continuously conveyed.

FIG. 21 shows one of the embodiment of the charging and receiving means for capsules, which is employed in the capsule hydraulic-transportation system according to the present invention.

A plurality of distributing ducts 91a to 91c are connected at ends thereof to a duct 18 by way of charging valves 92a to 92c, and are connected at the other ends thereof to a duct 13 by way of transportation valves 93a to 93c, which distributing ducts are mounted in parallel relation to one another and bypassed to a pipe line (not shown), respectively. Connected to the distributing ducts 91a to 91c on the side of the duct 18 are charging ducts 97a to 97c for the transportation capsules 96, which ducts 97a to 97c are provided with feeding valves 94a to 94c and charging valves 95a to 95c. On the other hand, connected to the distributing ducts 91a to 91c on the side of the duct 13 are capsule receiving ducts 100a to 100c for empty capsules 99 which capsule receiving ducts are provided with capsule receiving valves 98a to 98c, respectively. A low pressure pump 103 is connected to the charging ducts 97a to 97c between the feeding valves 94a to 94c and the charging valves 95a to 95c through a pipe 104 and liquid filling valves 101a to 101c on one hand and through a pipe 105 and liquid on the other hand, discharging valves 102a to 102c. A liquid feeding tank 106 is connected to a pipe 105 on the suction side of the low pressure pump 103.

By these arrangements, in order to charge transportation capsules 96 through the distributing duct 91b into a pipe line (not shown), the charging valve 95b in the charging duct 97b is closed so as to shut the distributing duct 91b, and thereafter the feeding valve 94b is opened to release the charging duct 97b to atmosphere. Furthermore, when the liquid discharging valve 102b is opened so as to partly discharge the transportation liquid from the charging duct 97b, then the transportation capsules 96 are successively dropped or charged into the charging duct 97b by way of the feeding valve 94b.

After the completion of the charge of the transportation capsules 96 into the charging duct 97b, the liquid is filled into the charging duct 97b by means of the low pressure pump 103. Then, feeding valve 94b is closed and the charging valve 95b is opened to transport transportation capsule 96 under pressure into the distributing duct 91b, and, at the same time, to convey empty capsules 99 present in the duct by way of a capsule receiving valve 98b into the capsule charging means (not shown).

When the empty capsules 99 in the distributing duct 91b have been conveyed, then the capsule receiving valve 98b is closed and the charging valve 92b is opened, so that, as the transportation valve 93b is being opened, the capsules 96 are conveyed into a pipe line (not shown) due to the hydraulic pressure given by the high pressure pump (not shown) of the capsule receiving means.

By repeating the aforesaid operation for the respective distributing duct at a suitable timed sequence, transportation capsules can be continuously fed from the feeding means into the pipe line, and empty capsules can be continuously returned from the pipe line into the capsule charging means (not shown).

FIGS. 22 and 23 show one embodiment of the valve means for use in the capsule hydraulic-transportation system according to the present invention.

A valve body 108 is formed with an inlet port 109 and outlet port 110 for capsules 48, and the ports 109 and exit 110 are open to a valve chamber 111. Supported in the center of the valve chamber 111 by valve stems 114 and 115 are a pair of valve plates 112 and 113. The valve plate 112 extends into the valve chamber 116, and the valve plate 113 extends into the valve chamber 117. Valve spring 118 and 119 are respectively mounted between the valve plate 112 and the valve stem 114 and between the valve plate 113 and the valve stem 115 to urge the valve plates 112 and 113. The valve stems 114 and 115 respectively are fitted in grooves 112a and 113a formed in the valve plates 112, 113, respectively to support the valve plates 112, 113 movably in the direction of the axis of the valve. Packings 120 and 121 are slidingly fitted on the journaled portions of the valve stems 114, 115 to provide water tightness therebetween. Provided on the respective opposite ends of the valve stems 114, and 115 are valve drive means 122, 123, respectively, which drive the valve stems 114 and 115 in the opposite direction in synchronism with each other.

Capsule retaining surfaces 112b, 113b of the respective valve plates 112, 113 are formed into a semispherical shape, and provided with seat packings 124, 125 in the peripheral end walls thereof to thereby present water tightness between the ports 109 and 110 with a capsule interposed between the packings. On the opposite sides of the respective valve plates 112 and 113 by means of springs 128a, 128b and 129a, 129b fitted between the valve sheets and the valve body 108, thereby isolating the valve chamber 111 from the valve chamber 116, respectively. Retaining seats 130a, 130b and 131a, 131b are mounted on the opposite sliding surfaces of the valve plates 112, 113.

By these arrangements, when a capsule position detecting means (not shown) detects a capsule 48 transported as shown by an arrow, the detecting signal is transmitted to the valve drive means 122, 123 to cause the valve stems 114, 115 to be urged towards the center of the valve to thereby retain the capsule 48 by means of the semi-spherical capsule retaining surfaces 112b, 113b of the valve plates.

A capsule remains held while the inertia of the capsule together with an increase of pressure on the inlet side of the valve plates causes the valve plates to move toward the outet side of the valve to urge the springs 128a, 129b to thereby isolate the inlet 109 from the outlet 110 in water tight relation. In this respect, if the strengths of springs 128a, 128b and 129a, 129b and valve springs 118, 119 are adjusted to suitable values, the impact induced by retaining a capsule may be moderated.

FIGS. 24 to 27 show a further embodiment of the valve means.

In FIG. 24, an inlet port 109 for capsules 48 is communicated with an outlet port 110 by way of a bypass pipe 134, a manually operated valve 132 and an orifice 133.

The manually operated valve 132 is a stop valve which is normally opened, and the orifice 133 is set to such a minimum flow rate as causing no water hammer during the retention of a capsule. Accordingly, water flow on the side of the inlet port 109 is introduced through the orifice 133 to the side of the outlet port 110 during the retention of a capsule, so that water hammer due to the sharp increase in pressure is avoided.

As shown in FIG. 25, seal rings 135, 136 and 137, 138 are arranged in two rows in the peripheral end wall portions of the capsule retaining surfaces 112b, 113b of the valve plates 112, 113 such that the spacing between the two rows is set to be larger than that between adjoining capsules.

As a result, either one of the two rows of seal rings can retain a capsule 48.

In FIGS. 26 and 27, sealing pipes 139, 140 and 141, 142 are embedded in the peripheral end wall portions of the capsule retaining surfacces 112b, 113b of the valve plates 112, 113 which sealing pipes are suitably open to the inlet side of the valve plates 112, 113 by way of pressure introducing pipes 143, 144 and 145, 146.

Accordingly, when a capsule is retained by the valve plates, then the water pressure on the inlet side of the valve plates is increased, which pressure is transmitted to the respective sealing pipes by way of the respective pressure introducing pipes to thereby retain a capsule with increased strength and water tightness.

FIGS. 28 and 29 show one embodiment of the check valve means for use in the capsule hydraulic-transportation system according to the present invention.

A valve body 147 is formed with an inlet port 148 and an outlet port 149 for the capsules, which ports communicate with a valve chamber 150.

A valve plate 151 is pivotally supported on a valve stem 152 in the valve chamber to shut or open the inlet port 148. A packing 153 is fitted on the journaled portions of the valve stem 152, to allow the sliding of the stem in water tight manner.

An upper guide plate 154 of a trough shape for capsules is mounted on the inlet side surface of the valve plate 151 which is adapted to shut the inlet port 148 due to the gravity of the valve plate all the times.

A valve plate seat 155 is attached to the valve plate 151, and a valve body seat 156 is attached to the peripheral wall of the valve chamber 150 on the side of the inlet port thereof. The opening of the valve plate 151 is limited by stopper 157 provided in the upper portion of the valve chamber 150 such that the upper guide late 154 is rendered parallel with the axis of the valve in the fully opened position. A lower guide plate 158 of a semi-conical shape is mounted on the bottom portion of the valve chamber 150 in such a manner as to confront the upper guide plate 154 in the fully opened position of the valve plate.

By these arrangements, the valve plate 151 is free to pivotally open on the valve stem 152 due to the water pressure from the inlet port 148 to bring the inlet port 148 into communication with the outlet port 149. However, the valve plate seat 151 is urged against the valve body seat 152 due to the water pressure from the outlet portion 149 to sealingly shut the duct.

Accordingly, until a capsule is transported in the direction of an arrow shown in FIG. 28, the valve plate 151 has already been lifted up to its preliminary open position by the water flow. Therefore, the capsule advances into the interior of the valve while urging the upper guide plate 150 mounted on the valve plate, and then introduced to the outlet port 149 along a path defined by the lower guide plate 158.

When a given number of capsules have passed through the valve body, the water flow in the pipe is stopped, and the inlet port 148 is gradually closed, and the duct is tightly shut due to the action of the water pressure on the side of the outlet port 149.

As is apparent from the foregoing description, the capsule hydraulic-transportation system according to the present invention presents the following advantages:

1. The transportation system according to the present invention is low in the cost of equipments and operating expense, and permits a long distance transportation. In addition, its continuous operation permits the transportation of a great amount of materials and is free of public nuisance attended by the transportation. Still furthermore, there is no danger of materials being sedimented and solidified in the pipe during transportation, thereby avoiding clogging thereof, and thus smooth and positive transportation may be insured.

2. Even if the specific gravity of the capsules to be charged into the pipe route is smaller than that of the transporting liquid, there may be achieved continuous, smooth and positive transportation.

3. According to the capsule hydraulic-transportation system according to the present invention, charging and taking-out operation may be simply and positively accomplished.

4. The capsules charged with materials to be transported, and empty capsules may be forwarded and returned at the same time, so that there results an efficient operation in terms of time.

5. According to the valve means according to the present invention, the stroke of the valve may be extremely shortened, so that the opening and closing operation of the valve may be conducted instantaneously. In addition, the aforesaid valve means does not resort to a method whereby to stop the capsules by inserting the valve plate into between the capsules, so that the transportation cycle of capsules may be compressed to a great extent. On the other hand, even if the capsule is stopped instantaneously, there results no water impact in the pipe, thus insuring the positive and safe transportation of capsules.

6. According to the check valve means for capsules, there is no danger of jamming of capsules which leads to the rupture thereof, nor the failure of the valve body. In addition, the need to use an external drive means such as a valve-plate-opening-and-closing means is eliminated, so that there may be achieved a compact and light weight system, which in turn leads to much saving in manufacturing cost.

What is claimed is:

1. A capsule hydraulic-transportation system comprising a plurality of capsule forwarding stations; at least one capsule receiving station; and a transport pipe line interconnecting said plurality of capsule forwarding stations with said capsule receiving station for transporting capsules therebetween; wherein each of said forwarding stations comprise first means for providing said capsules in timed sequence, and second means interconnected with said first means for continuously feeding said capsules provided by said first means into said transport pipe line, said second means further receiving capsules from said transport pipe line for supply back to said first means;

said first means comprising a plurality of feeding ducts arranged in parallel relation to one another, third means for selectively introducing a predetermined number of capsules respectively into each of said plurality of feeding ducts in a predetermined timed sequence through a first valve in each of said plurality of feeding ducts, a discharge duct coupled to each of said plurality of feeding ducts through a second valve in each of said feeding ducts for discharging said capsules continuously to said second means, first pipe means for introducing transportation liquid under high pressure into each of said plurality of feeding ducts downstream of said first valve in the direction of travel of said capsules, said first pipe means being connected to each of said feeding ducts through a third valve, and second pipe means for discharging said transportation liquid from each of said feeding ducts through a fourth valve, said second pipe means being connected to each of said feeding ducts upstream of said second valve in the direction of travel of said capsules.

2. A capsule hydraulic-transportation system according to claim 1, wherein said plurality of feeding ducts are disposed slanted downwardly in parallel from said third means to said second valve, and wherein means for preventing back-flow of said capsules in said feeding ducts are provided in each of said plurality of feeding ducts, such that said capsules are continuously discharged regardless of the specific gravity of each of said capsules.

3. A capsule hydraulic-transportation system according to claim 1, wherein said third means comprise at least one chamber containing said capsules, said chamber communicating with said plurality of feeding ducts; and a rotary member rotatably mounted in said chamber, and having capsule retaining grooves formed radially at the outer peripheral edge portion of said rotary member, said rotary member being rotated such that said capsule retaining grooves are arranged to be coincident with respective feeding ducts to distribute capsules from said chamber to said feeding ducts.

4. A capsule hydraulic-transportation system according to claim 3, wherein spring means are disposed in said capsule retaining grooves for pushing capsules out of said grooves.

5. A capsule hydraulic-transportation system according to claim 1, wherein said third means comprise a chamber containing said capsules; a rotary member rotatably mounted in said chamber, and having capsule retaining grooves formed radially at the outer peripheral edge portion of said rotary member; and a switching disk mounted for separate rotation about the axis of rotation of said rotary member, said switching disk having a single discharging port adapted to be coincident with said capsule retaining grooves, and said switching disk being rotated intermittently to align said discharging port with respective ones of said feeding ducts, such that said capsules are passed from said capsule retaining grooves to said feeding ducts.

6. A capsule hydraulic-transportation system according to claim 1, wherein counter means are provided in said discharge duct downstream of said second valve in each of said feeding ducts for counting the number of capsules passing from each of said feeding ducts, said counter means closing said second valve after said predetermined number of said capsules has been counted.

7. A capsule hydraulic-transportation system according to claim 6, wherein said counter means includes photoelectric detection means for detecting said capsules, said detection means including windows formed on said discharge duct.

8. A capsule hydraulic-transportation system according to claim 7, wherein sid windows are disposed according to the relationships $$A < d - D/2$$

$$B > \tfrac{1}{2}(D - d - d_o)$$

wherein A represents the height from the center of said discharge duct to the upper edge of said window, B represents the height from the center of said discharge duct to the lower edge of said window, D represents the inner diameter of said discharge duct, $d$ represents the outer diameter of said capsule, and $d_o$ represents the outer diameter of central projections at the ends of said capsule.

9. A capsule hydraulic-transportation system according to claim 6, wherein said capsules are formed with projections substantially centrally on at least one end face, such that a space is provided between adjacent capsules, said space permitting counting of capsules.

10. A capsule hydraulic-transportation system according to claim 1, wherein said second means comprise a first plurality of parallel distributing ducts for said capsules, each of said ducts being provided at a first end with a fifth valve and at a second end with a sixth valve, said first ends of said distributing ducts being connected by respective first branch lines with said transport pipe line and by respective second branch lines to said first means, and said second ends of said distributing ducts being connected by third branch lines to said transport pipe line and by fourth branch lines with said first means upstream of said third means.

* * * * *